United States Patent
Lu et al.

(10) Patent No.: US 9,250,851 B2
(45) Date of Patent: Feb. 2, 2016

(54) FOLDABLE DISPLAY AND IMAGE PROCESSING METHOD THEREOF

(71) Applicant: INDUSTRIAL TECHNOLOGY RESEARCH INSTITUTE, Hsinchu (TW)

(72) Inventors: Min-Yao Lu, Taichung (TW); Cheng-Chung Lee, Hsinchu (TW); Sheng-Po Wang, Zhongli (TW); Heng-Yin Chen, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 331 days.

(21) Appl. No.: 13/759,090

(22) Filed: Feb. 5, 2013

(65) Prior Publication Data

US 2014/0062856 A1    Mar. 6, 2014

(30) Foreign Application Priority Data

Sep. 6, 2012    (TW) .............................. 101132448 A

(51) Int. Cl.
*G09G 5/00* (2006.01)
*G06F 3/14* (2006.01)
*G09G 5/393* (2006.01)
(Continued)

(52) U.S. Cl.
CPC ................ *G06F 3/14* (2013.01); *G06F 1/1641* (2013.01); *G06F 1/1677* (2013.01); *G06F 3/1446* (2013.01); *G09G 5/393* (2013.01); *H04M 1/0218* (2013.01); *G09G 2340/0407* (2013.01); *G09G 2356/00* (2013.01)

(58) Field of Classification Search
CPC ....... G06F 1/1641; G06F 1/1677; G06F 3/14; G06F 3/1446; G09G 5/393; G09G 2340/0407; G09G 2356/00; H04M 1/0214
See application file for complete search history.

(56) References Cited

U.S. PATENT DOCUMENTS

| 5,185,666 A | 2/1993 | Capitant et al. |
| 5,631,983 A | 5/1997 | Ohnishi et al. |

(Continued)

FOREIGN PATENT DOCUMENTS

| CN | 101788850 A | 7/2010 |
| CN | 102081894 A | 6/2011 |

(Continued)

OTHER PUBLICATIONS

English abstract translation of TW201011732 (Published Mar. 16, 2010).

(Continued)

*Primary Examiner* — Adam R Giesy
(74) *Attorney, Agent, or Firm* — McClure, Qualey & Rodack, LLP

(57) ABSTRACT

A foldable display and an image processing method thereof are disclosed. The foldable display comprises a display module, a memory, a sensor module, and a processing unit. The sensor module senses a bending state of the display module. The processing unit generates adjusted images according to an image signal, and stores those adjusted images to a plurality of memory addresses of the memory. The processing unit selects a reading address from those memory addresses according the bending state. The processing unit selects a corresponding adjusted image from the memory according to the reading address and outputs the corresponding adjusted image to the display module.

20 Claims, 8 Drawing Sheets

(51) Int. Cl.
*G06F 1/16* (2006.01)
*H04M 1/02* (2006.01)

(56) References Cited

U.S. PATENT DOCUMENTS

| | | |
|---|---|---|
| 6,486,890 B1 | 11/2002 | Harada et al. |
| 7,446,757 B2 | 11/2008 | Mochizuki et al. |
| 7,586,492 B2 | 9/2009 | Riach et al. |
| 7,796,135 B1 | 9/2010 | Diard et al. |
| 8,773,411 B2 | 7/2014 | Van Lieshout et al. |
| 8,922,531 B2 | 12/2014 | Lee |
| 8,947,320 B2 | 2/2015 | King et al. |
| 2006/0058079 A1 | 3/2006 | Goto |
| 2007/0285341 A1* | 12/2007 | Manning ............... G06F 1/1616 345/1.3 |
| 2008/0026833 A1* | 1/2008 | Yoshizawa ...................... 463/26 |
| 2010/0064244 A1 | 3/2010 | Kilpatrick, II et al. |
| 2010/0182265 A1 | 7/2010 | Kim et al. |
| 2011/0054785 A1* | 3/2011 | Wood et al. ................... 701/209 |
| 2011/0057873 A1* | 3/2011 | Geissler et al. ............... 345/156 |
| 2011/0102390 A1 | 5/2011 | Moriwaki |
| 2011/0126141 A1* | 5/2011 | King ..................... G06F 1/1616 715/769 |
| 2012/0188153 A1* | 7/2012 | Tziortzis et al. .............. 345/156 |
| 2012/0223881 A1* | 9/2012 | Otsubo ......................... 345/156 |
| 2012/0280924 A1* | 11/2012 | Kummer ............. H04M 1/0235 345/173 |
| 2012/0320541 A1* | 12/2012 | Chen ............................. 361/749 |
| 2013/0342439 A1* | 12/2013 | Kwack ................. G09G 3/3225 345/156 |
| 2014/0098034 A1* | 4/2014 | Hack ..................... G06F 1/1677 345/173 |

FOREIGN PATENT DOCUMENTS

| | | |
|---|---|---|
| CN | 102141878 A | 8/2011 |
| EP | 2166443 A2 | 3/2010 |
| JP | 2010211211 A | 9/2010 |
| TW | 200416517 | 9/2004 |
| TW | 200502916 | 1/2005 |
| TW | 200931362 A | 7/2009 |
| TW | 201011732 | 3/2010 |
| TW | 201033891 A | 9/2010 |

OTHER PUBLICATIONS

English abstract translation of TW200502916 (Published Jan. 16, 2005).

Kim, et al.:"16.2: World-Best Performance LTPS TFTs with Robust Bending Properties on Amoled Displays"; SID 11 Digest ISSN 0097-966X/11/4201-0194-$1.00 © 2011 SID; pp. 194-197.

Yoneya, et al.: "22.4: Flexible Electrophoretic Display Driven by Solution-Processed OTFTs"; SID 11 Digest ISSN 0097-966X/11/4201-0288-$1.00 © 2011 SID; pp. 288-291.

Moere, et al.: "A Wearable Folding Display for Self-Expression"; OZCHI 2006, Nov. 20-24, 2006, Sydney, Australia.; http://portal.acm.org/dl.cfm; pp. 301-304.

Lee, et al.: "P-103: Redistributed Deep States Created by Mechanical Bending to Improve the Electrical Reliability of a-Si:H TFTs on Flexible Substrates"; SID 10 Digest ISSN 0097-966X/10/4103-1636-$1.00 © 2010 SID; pp. 1636-1639.

Kwon, et al.: "Robust Folding Structure for a Foldable Display"; Samsung Advanced Institute of Technology (SAIT), San14-1 Nongseo-dong, Giheung-gu, Yongin-si 449-712, Korea; ISSN-L 1883-2490/17/1713 © 2010 ITE and SID; pp. 1713-1716.

Sekitani, et al.: "22.1: Invited Paper: Stretchable and Foldable Displays using Organic Transistors with High Mechanical Stability"; Department of Electrical Engineering and Information systems, University of Tokyo, Japan; SID 11 Digest ISSN 0097-966X/11/4201-0276-$1.00 © 2011 SID; pp. 276-279.

CN Office Action dated Apr. 3, 2015 in corresponding Chinese application (No. 201210530657.X).

TW Office Action dated Aug. 12, 2015 in corresponding Taiwan application (No. 101132448).

* cited by examiner

FOLDABLE DISPLAY AND IMAGE PROCESSING METHOD THEREOF

This application claims the benefit of Taiwan application Serial No. 101132448, filed Sep. 6, 2012, the disclosure of which is incorporated by reference herein in its entirety.

TECHNICAL FIELD

The disclosure relates in general to a foldable display and an image processing method thereof.

BACKGROUND

In recent years, flexible electronic products and display technology have gradually attracted people's attention, and various derivative products using flexible display are gradually provided. Due to the features of lightweight, thinness, unbreakability, foldability, and curliness, the application of flexible display has great potential in various fields. Of various applications of flexible display, foldable display is most commercialized.

With the feature of foldability, a foldable display is able to display with different sizes, areas and efficiencies in response to users' different needs. That is, the foldable display can operate in several folding modes, such as unfolded mode, one-folding mode or multi-folding mode.

After the foldable display is folded, the size, resolution or aspect ratio of an original image must be processed and converted before the original image can be used as a display frame of the foldable display. Therefore, after the foldable display is folded, a certain amount of image processing time is required for the foldable display to display a corresponding frame. Therefore, how to reduce the image processing time after the foldable display is folded to increase the convenience of use has become a prominent task for the industries.

SUMMARY

The disclosure is directed to a foldable display and an image processing method thereof.

According to one embodiment, a foldable display and an image processing method thereof are provided. The foldable display comprises a display module, a memory, the sensor module and a processing unit. The sensor module senses a bending state of the display module. The processing unit generates a plurality of adjusted images according to an image signal, and respectively stores those adjusted images to a plurality of memory addresses of the memory. The processing unit selects a reading address from those memory addresses according to the bending state, and selects a corresponding adjusted image from the memory according to the reading address and outputs the corresponding adjusted image to the display module.

According to another embodiment, an image processing method of a foldable display is provided. The foldable display comprises a sensor module, a display module and a memory. The image processing method comprises the following steps of: generating a plurality of adjusted images according to an image signal; respectively storing those adjusted images to a plurality of memory addresses of the memory; sensing a bending state of the display module by the sensor module; selecting a reading address from those memory addresses according to the bending state, and selecting a corresponding adjusted image from the memory according to the reading address and outputting the corresponding adjusted image to the display module.

The above and other aspects of the disclosure will become better understood with regard to the following detailed description of the non-limiting embodiment(s). The following description is made with reference to the accompanying drawings.

Figure 1:
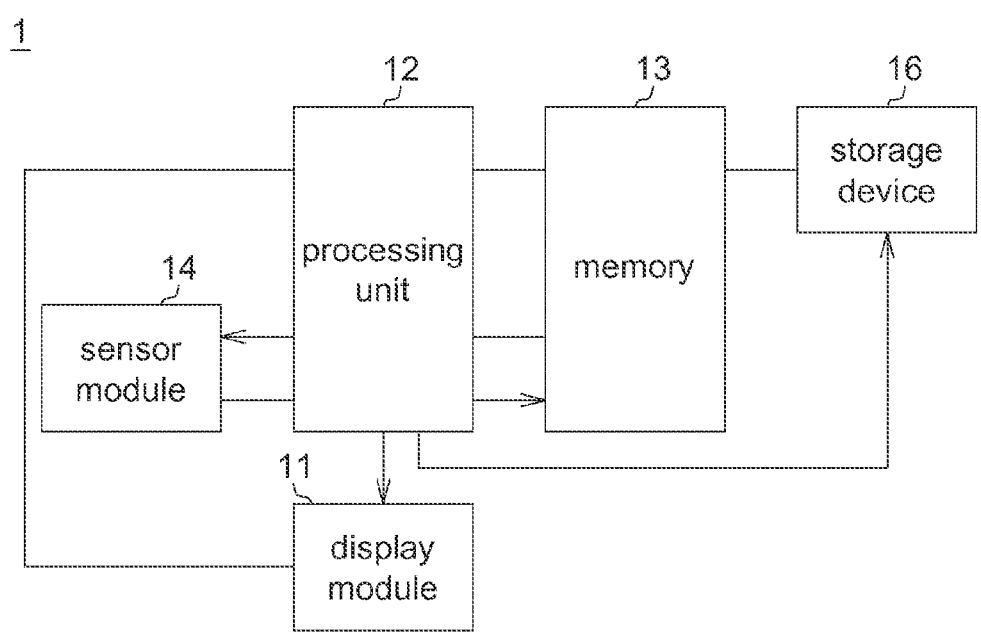
FIG. 1 shows a system architecture diagram of a foldable display.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

Figure 2:
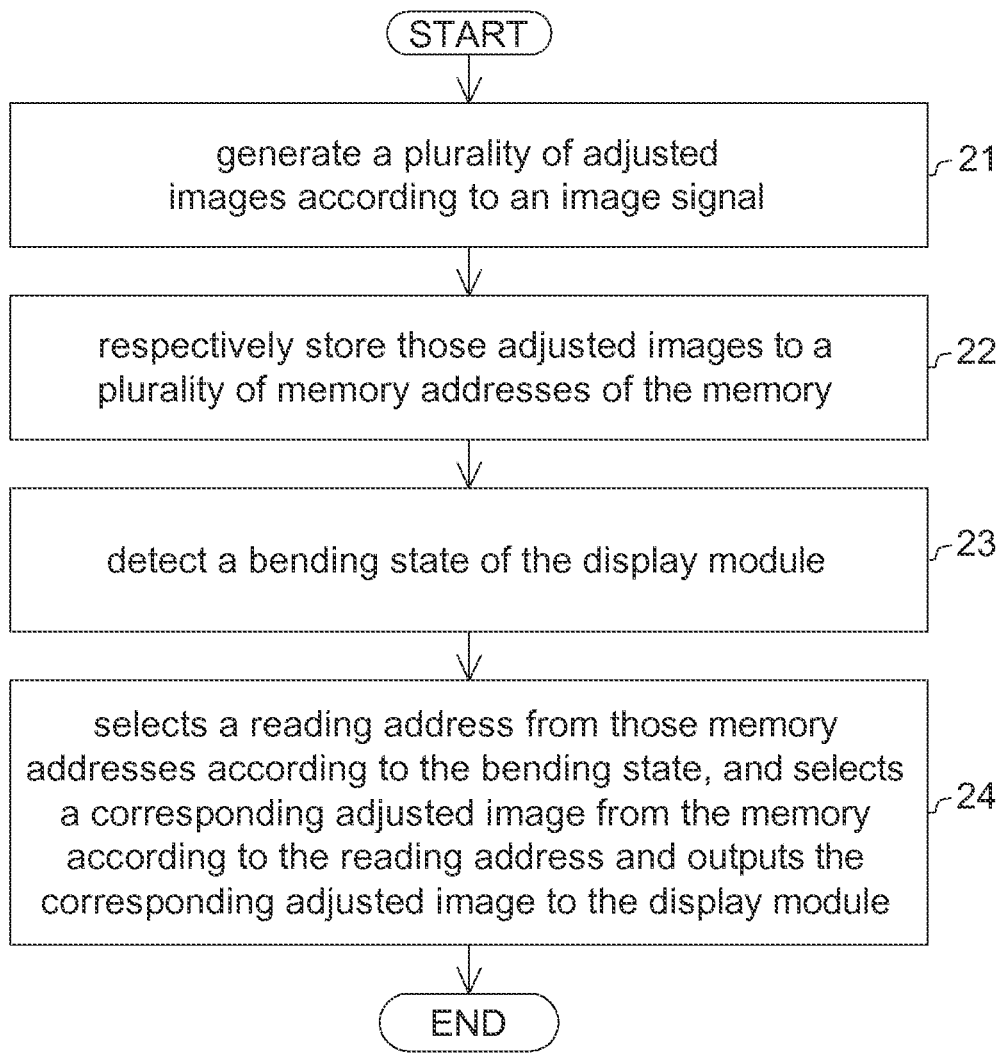
FIG. 2 shows a flowchart of an image processing method of a foldable display.
Figure 8:
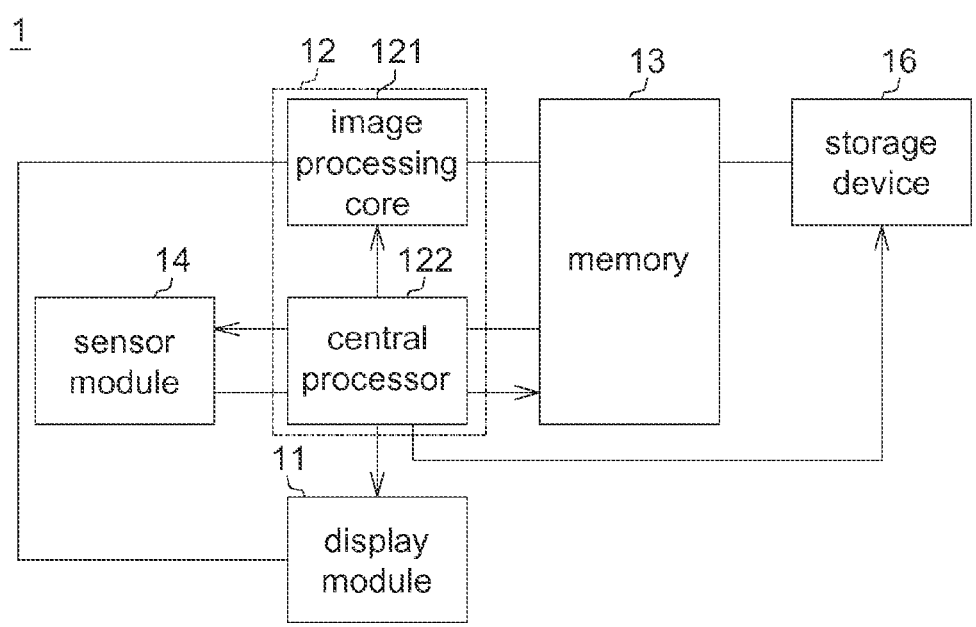
FIG. 8 shows a block diagram of a foldable display according to a first embodiment.

Referring to FIG. 1, FIG. 2 and FIG. 8. FIG. 1 shows a system architecture diagram of a foldable display. FIG. 2 shows a flowchart of an image processing method of a foldable display. In FIG. 1 and FIG. 8, data lines are denoted by solid lines and the control lines are denoted by arrows. The foldable display 1 comprises a display module 11, a processing unit 12, the memory 13, a sensor module 14 and a storage device 16. The display module 11 is formed by one single substrate or multiple substrates connected together. The processing unit 12 further comprises an image processing core 121 and a central processor 122. Alternatively, the image processing core 121 and the central processor 122 can be integrated into one single processor.

The image processing core 121 executes a number of image processing procedures such as linear image enlargement/reduction, non-linear image enlargement/reduction, aspect ratio adjustment, image rotation, image deformation adjustment, brightness calibration, color calibration, and adding icons, texts, thumbnails or borders. The central processor 122 controls the display module 11, the image processing core 121, the memory 13, the sensor module 14 and the storage device 16. The storage device 16 stores an image signal such as a static or a dynamic image signal.

The image processing method can be used in the foldable display 1, and comprises the following steps. In step 21, the image processing core 121 generates a plurality of adjusted images according to an image signal, wherein those adjusted images respectively correspond to the folding modes of the display module 11. Examples of the folding modes comprise unfolded mode, one-folding mode and two-folding mode, in which the sizes of those adjusted images generated by the image processing core 121 are respectively equal to 100%, ⅔ and ⅓ of the sizes of the original images so that the displayed contents are optimized.

In step 22, the image processing core 121 respectively stores those adjusted images to a plurality of memory addresses of the memory 13. For convenience of elaboration, the memory addresses are exemplified by address A, address B and address C in the present embodiment, but the disclosure is not limited thereto, and the number of memory address may vary with the number of adjusted images.

In step 23, the sensor module 14 detects a bending state of the display module 11. In step 24, the central processor 122 selects a reading address from the above three memory addresses (that is, address A, address B and address C) according to the bending state, and further controls the image processing core 121 to select a corresponding adjusted image from the memory 13 according to the reading address and output the corresponding adjusted image to the display module 11.

Before the foldable display 1 is folded, the image processing core 121 already generates a corresponding adjusted image according to the current folding mode. After the foldable display 1 is folded, the display module 11 can immediately display the corresponding adjusted image, hence reducing the waiting time and increasing the convenience of use.

Figure 3:
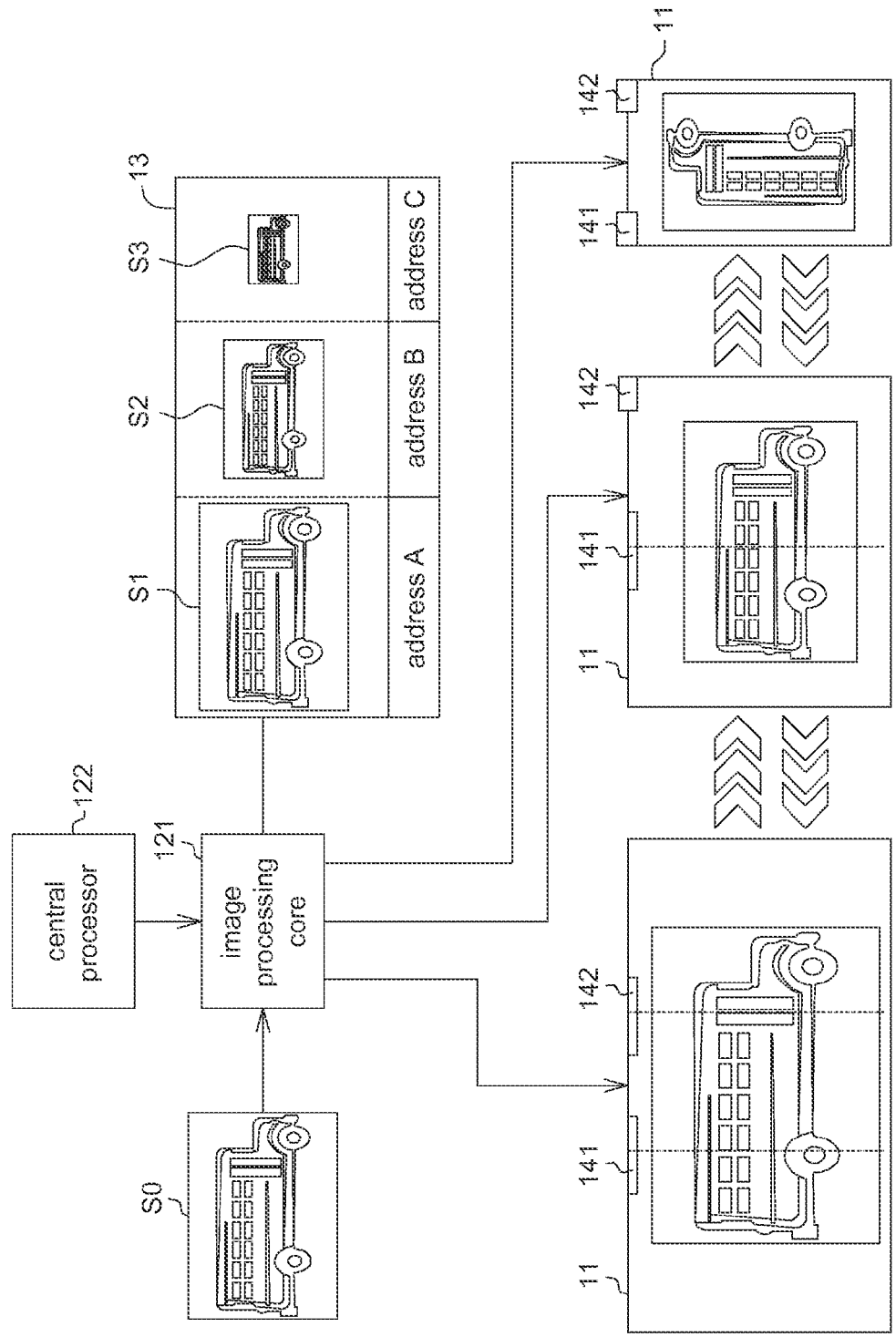
FIG. 3 shows a process for selecting an adjusted image according to a first embodiment.

Referring to FIG. 1 and FIG. 3. FIG. 3 shows a process for selecting an adjusted image according to a first embodiment. The sensor module 14 further comprises a sensor 141 and a sensor 142. The sensor 141 and the sensor 142 are such as a bending sensor, a pressure sensor, a light sensor, a touch sensor, a mechanical sensor, a magnetic sensor, an acceleration sensor or a gyroscope. Examples of the folding modes of the display module 11 comprise unfolded mode, one-folding mode and two-folding mode. The image signal is such as a static image signal. The image processing core 121 adjusts an original image S0 of the static image signal as adjusted images S1~S3. The size of the adjusted image S1 is the same with that of the original image S0. The size of the adjusted image S2 is ⅔ of the size of the original image S0. The size of the adjusted image S3 is ⅓ of the size of the original image S0. The size of the adjusted image S1 is larger than that of the adjusted image S2, and the size of the adjusted image S2 is larger than that of the adjusted image S1. The image processing core 121 respectively stores the adjusted image S1, the adjusted image S2 and the adjusted image S3 to a plurality of memory addresses of the memory 13. The memory addresses are address A, address B and address C. The image processing core 121 such as enlarge/reduce and adjust the aspect ratio of the original image S0. The image processing core 121 further executes a number of image processing procedures such as image rotation, image deformation adjustment, brightness calibration, color calibration, and adding icons, texts, thumbnails or borders.

Figure 4:
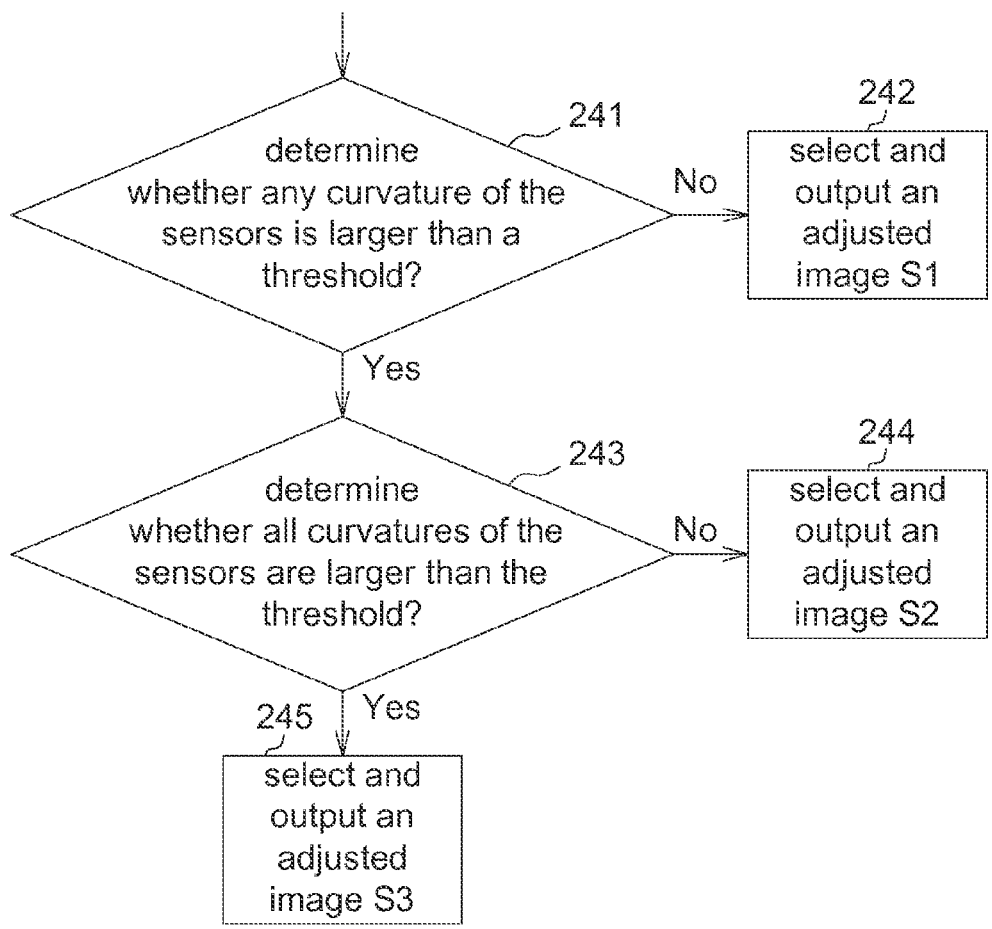
FIG. 4 shows a detailed flowchart of step 24.

Referring to FIG. 1, FIG. 3 and FIG. 4. FIG. 4 shows a detailed flowchart of step 24. Step 24 further comprises steps 241~245. In step 241, the central processor 122 determines whether the curvature of the sensor 141 or the sensor 142 is larger than a threshold. When both curvatures of the sensor 141 and the sensor 142 are not larger than the threshold, step 242 is performed. In step 242, the central processor 122 selects address A as a reading address, and further controls the image processing core 121 according to address A to select the adjusted image S1 and output the corresponding adjusted image to the display module 11. In other words, when both curvatures of the sensor 141 and the sensor 142 are not larger than the threshold, this indicates that the display module 11 is in an unfolded mode. The image processing core 121 selects the adjusted image S1 corresponding to the unfolded mode from address A and outputs the corresponding adjusted image to the display module 11.

When the curvature of the first sensor or the second sensor is larger than the threshold, the method proceeds to step 243, the central processor 122 determines that both curvatures of the sensor 141 and the sensor 142 are larger than larger than the threshold. When both curvatures of the sensor 141 and the sensor 142 are not larger than the threshold, the method proceeds to step 244. In step 244, the central processor 122 selects address B as a reading address, and further controls the image processing core 121 to select the adjusted image S2 from address B and output the corresponding adjusted image to the display module 11. In other words, when both curvatures of the sensor 141 and the sensor 142 are not larger than the threshold, this indicates that the display module 11 is in a one-folding mode. The image processing core 121 selects the adjusted image S2 corresponding to the one-folding mode from address B and outputs the corresponding adjusted image to the display module 11.

When both curvatures of the sensor 141 and the sensor 142 are larger than the threshold, the method proceeds to step 245. In step 245, the central processor 122 selects address C as a reading address, and further controls the image processing core 121 to select the adjusted image S3 from address C and outputs the corresponding adjusted image to the display module 11. In other words, when both curvatures of the sensor 141 and the sensor 142 are larger than the threshold, this indicates that the display module 11 is in a two-folding mode. The central processor 122 selects the adjusted image S3 corresponding to the two-folding mode from address C and outputs the corresponding adjusted image to the display module 11.

Second Embodiment

Figure 5:
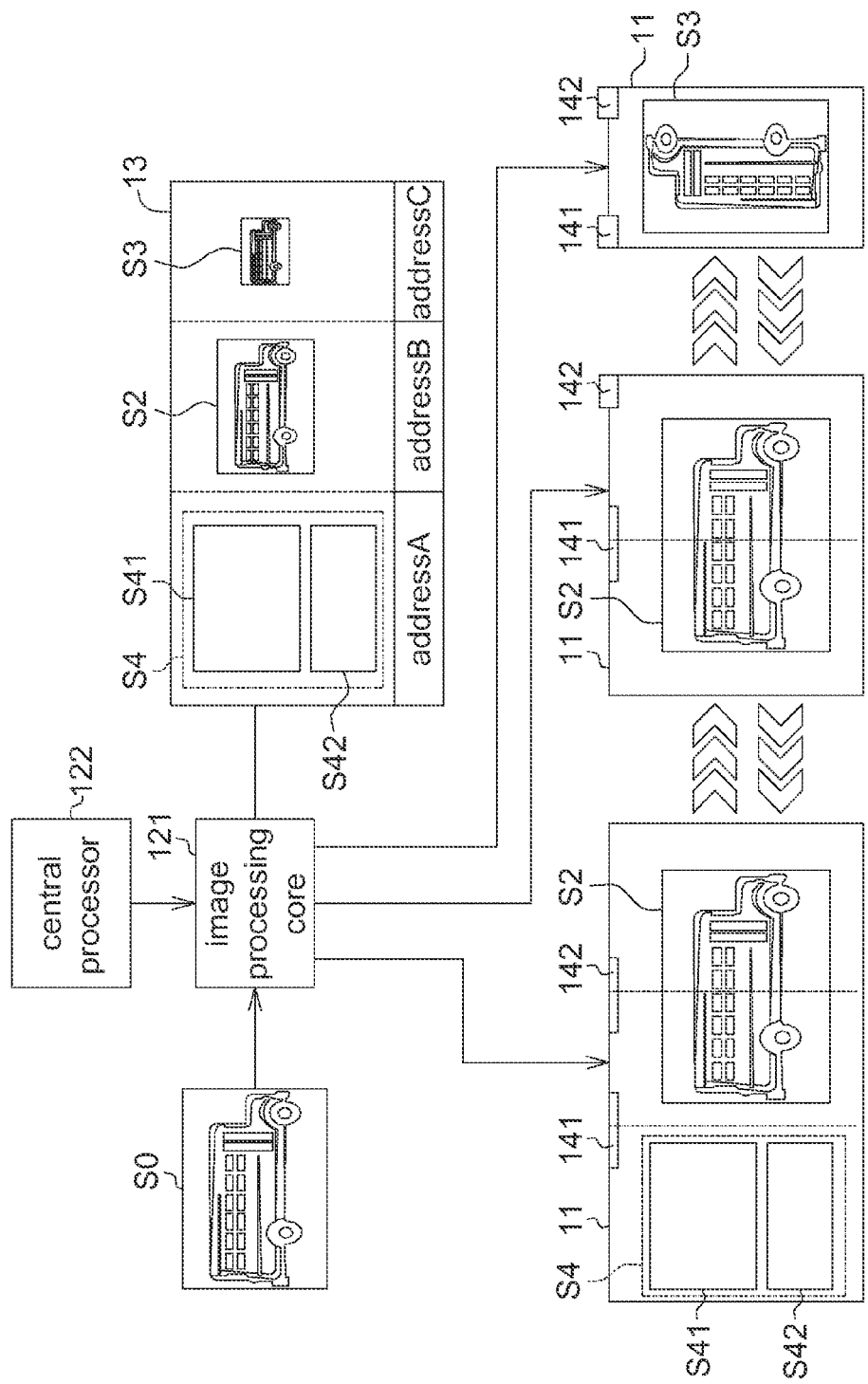
FIG. 5 shows a process for selecting an adjusted image according to a second embodiment.

Referring to FIG. 1 and FIG. 5. FIG. 5 shows a process for selecting an adjusted image according to a second embodiment. The second embodiment is different from the first embodiment mainly in that the image processing core 121 adjusts the original image S0 of a static image signal into an adjusted image S2 and an adjusted image S3, and respectively stores the adjusted image S2 and the adjusted image S3 to address B and address C of the memory 13. The image processing core 121 further generates a user interface S4, and stores the user interface S4 to address A of the memory 13. The user interface S4 such as comprises a related information S41 and an image processing item S42 of the original image S0. Examples of the related information S41 comprise image name, shooting date, shooting venue and image quality, and examples of the image processing item S42 comprise image enhancement and de-noising.

When the display module 11 is not folded, the central processor 122 controls the image processing core 121 to select a corresponding adjusted image S2 and a corresponding user interface S4 and output the corresponding adjusted images to the display module 11. In other words, when the display module 11 is in an unfolded mode, the central processor 122 controls the image processing core 121 to select the user interface S4 from address A of the memory 13 and output the corresponding adjusted image to the display module 11, and further controls the image processing core 121 to select the adjusted image S2 from address B of the memory 13 and output the corresponding adjusted image to the display module 11. The display module 11 concurrently displays the user interface S4 and the adjusted image S2.

When the display module 11 is folded once, the central processor 122 controls the image processing core 121 to select an adjusted image S2 corresponding to the one-folding mode from address B and output the corresponding adjusted image to the display module 11. When the display module 11 is folded twice, the central processor 122 controls the image processing core 121 to select an adjusted image S3 corresponding to the two-folding mode from address C and output the corresponding adjusted image to the display module 11.

Third Embodiment

Figure 6:
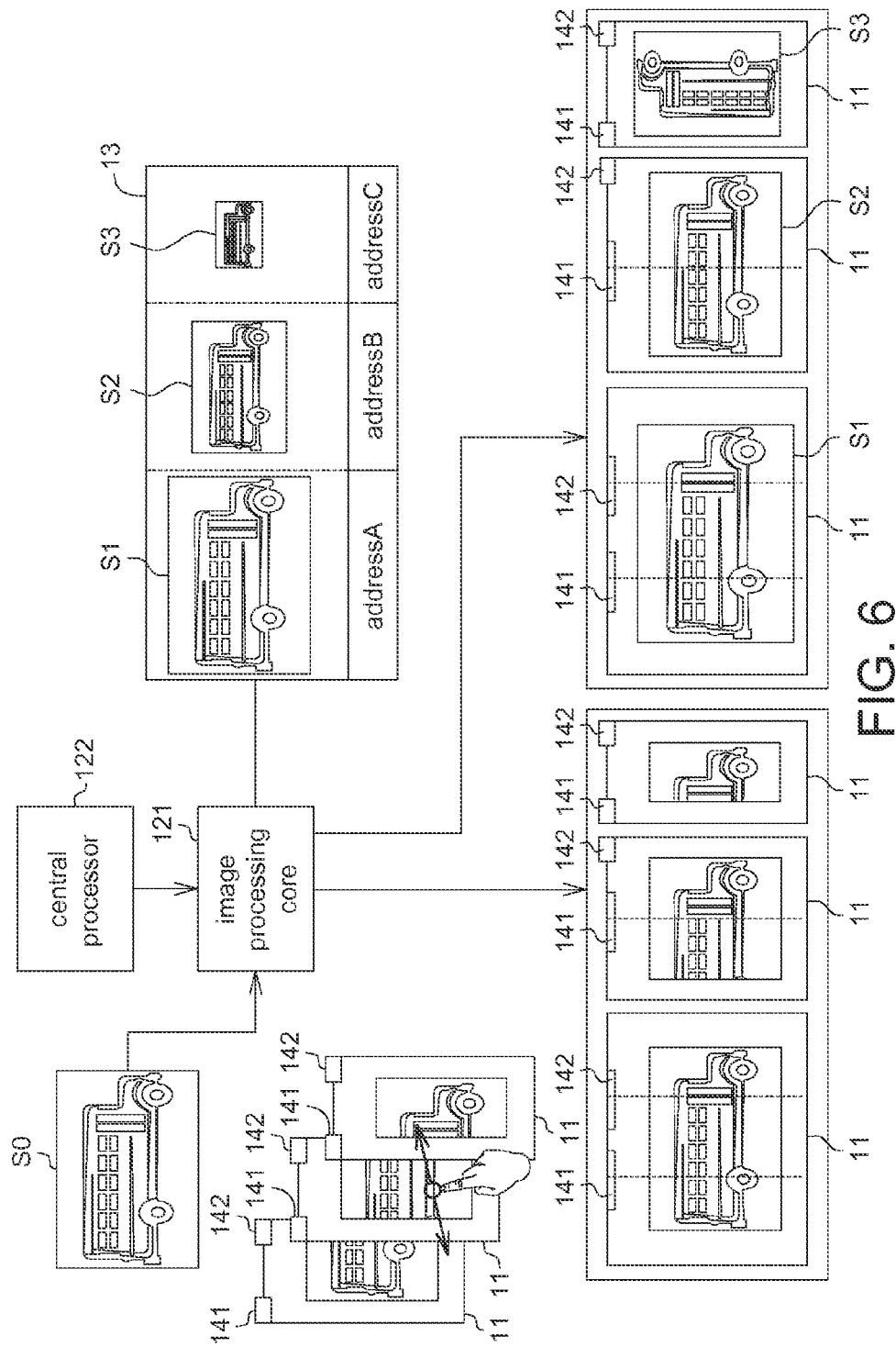
FIG. 6 shows a process for selecting an adjusted image according to a third embodiment.

Referring to FIG. 1 and FIG. 6. FIG. 6 shows a process for selecting an adjusted image according to a third embodiment. The third embodiment is different from the first embodiment mainly in that the central processor 122 of the third embodiment, based on an external command, further determines whether to select a corresponding adjusted image from the memory 13 according to a bending state of the display module 11 and output the corresponding adjusted image to the display module 11.

Based on the external command, if the central processor 122 determines not to select a corresponding adjusted image from the memory 13 according to the bending state of the display module 11 and not to output the corresponding adjusted image to the display module 11, the central processor 122 controls the image processing core 121 to clip the original image S0 being a static image signal, and display corresponding clipped images in different folding modes. The clipped image displayed by the display module 11 may further be dragged so that the user can view the complete picture of the original image S0.

Fourth Embodiment

Figure 7:
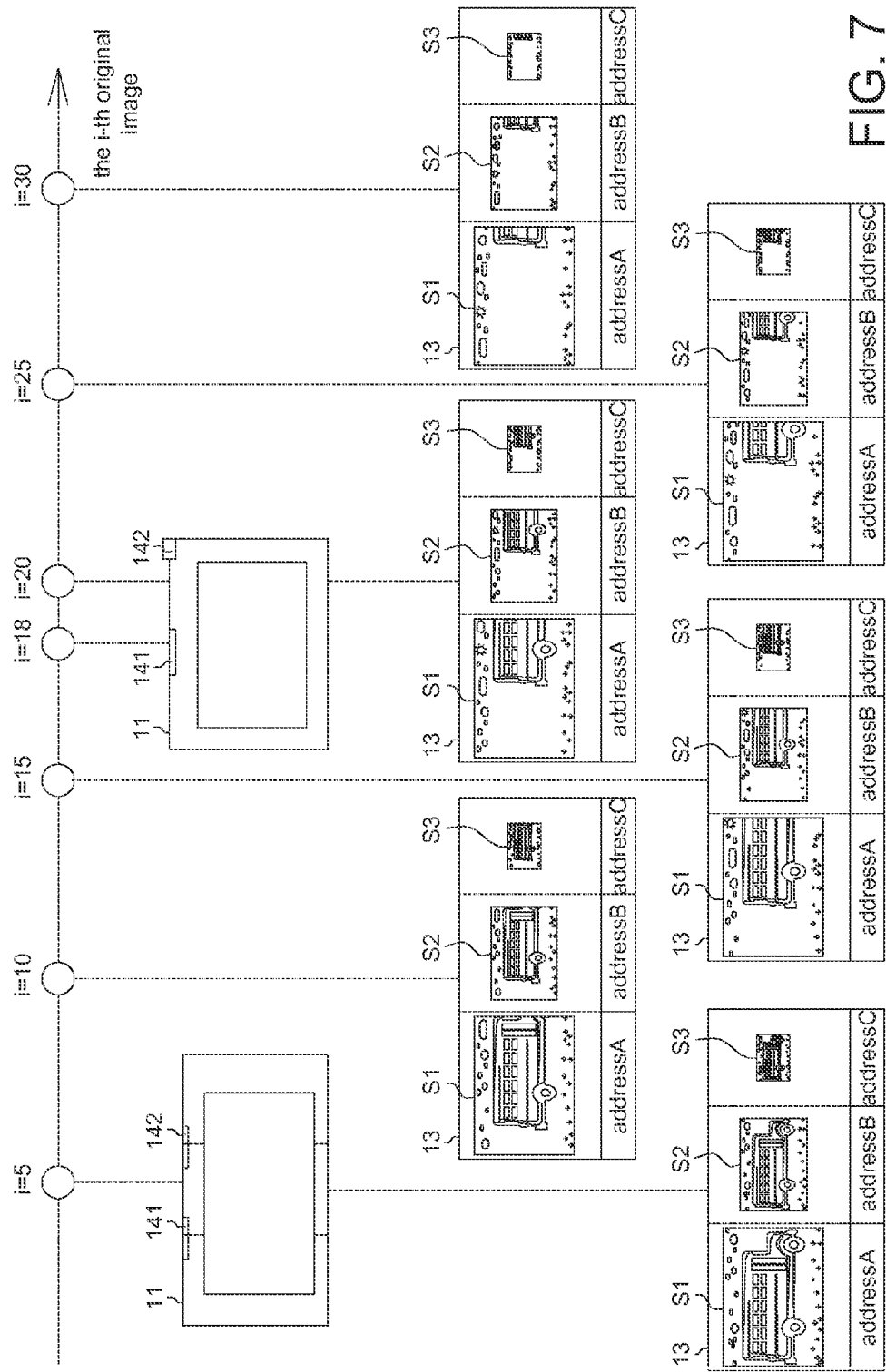
FIG. 7 shows a process for generating an adjusted image and a difference map according to a fourth embodiment.

Referring to FIG. 1, FIG. 3 and FIG. 7. FIG. 7 shows a process for generating an adjusted image and a difference map according to a fourth embodiment. The third embodiment is different from the first embodiment mainly in that when the image signal is a dynamic image signal, the image processing core 121 generates those adjusted images S1~S3 of the first embodiment at an interval of a plurality of original images, and the image processing core 121 further generates a difference map between those adjusted images and those original images.

For convenience of elaboration, in FIG. 7, the adjusted image is generated at an interval of 5 original images. When the display module 11 is folded at the 5N-th original image, the image processing is the same with that in the first embodiment, wherein, N is a positive integer not equal to 0. The central processor 122 controls the image processing core 121 to select a corresponding adjusted image from the memory 13 according to the bending state and output the corresponding adjusted image to the display module 11. When the display module 11 is folded at an original image other than the 5N-th original image, the image displayed by the display module 11 is obtained according to the difference map between the previous adjusted image and the current original image. Thus, the dynamic image processing time is reduced.

For example, the image processing core 121 generates adjusted images S1~S3 according to an image signal at the 5-th, the 10-th, the 15-th, the 20-th, the 25-th and the 30-the original images respectively. When the display module 11 is folded once at the 18-th original image, the central processor 122 controls the image processing core 121 to generate an image to be displayed by the display module 11 according to the difference map between the adjusted image S2 generated at the 15-th original image and the 15-th to the 18-th original images.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A foldable display, comprising:
   a display module;
   a memory;
   a sensor module detecting a bending state of the display module; and
   a processing unit generating a plurality of adjusted images according to an image signal and respectively storing those adjusted images to a plurality of memory addresses of the memory, wherein the processing unit selects a reading address from those memory addresses according to the bending state, and selects one of the adjusted images from the memory according to the reading address and outputs the selected adjusted image to the display module.
2. The foldable display according to claim 1, wherein the processing unit comprises:
   an image processing core generating those adjusted images according to the image signal, and respectively storing those adjusted images to those memory addresses; and
   a central processor controlling the image processing core to read the corresponding adjusted image according to the bending state and output the corresponding adjusted image to the display module.
3. The foldable display according to claim 2, wherein the image processing core further generates a user interface stored to the memory, and when the display module is not folded, the display module displays the user interface and the corresponding adjusted image.
4. The foldable display according to claim 1, wherein the sensor module comprises a first sensor and a second sensor, those adjusted images comprise a first adjusted image, a second adjusted image and a third adjusted image, the first adjusted image is larger than the second adjusted image, and the second adjusted image is larger than the third adjusted image, and when a curvature of the first sensor and a curvature of the second sensor are not larger than a threshold, the processing unit selects the first adjusted image and outputs the first adjusted image to the display module.
5. The foldable display according to claim 4, wherein when the curvature of the first sensor is larger than the threshold and the second sensor is not larger than the threshold, the processing unit selects the second adjusted image and outputs the second adjusted image to the display module.
6. The foldable display according to claim 4, wherein when both curvatures of the first sensor and the second sensor are larger than the threshold, the processing unit selects the third adjusted image and outputs the third adjusted image to the display module.
7. The foldable display according to claim 4, wherein the processing unit generates a difference map between a plurality of original images at an interval of the original images.
8. The foldable display according to claim 4, wherein each of the first sensor and the second sensor of the sensor module is a bending sensor, a pressure sensor, a light sensor, touch sensor, a mechanical sensor, a magnetic sensor, an acceleration sensor or a gyroscope.
9. The foldable display according to claim 1, wherein those adjusted images respectively correspond to a plurality of folding modes of the display module.

10. The foldable display according to claim 1, wherein the display module is formed by one single substrate.

11. The foldable display according to claim 1, wherein the display module is formed by multi-substrates connected together.

12. An image processing method of a foldable display comprising a sensor module, a display module and a memory, wherein the image processing method comprises:
- generating a plurality of adjusted images according to an image signal;
- respectively storing those adjusted images to a plurality of memory addresses of the memory;
- detecting a bending state of the display module by the sensor module; and
- selecting a reading address from those memory addresses according to the bending state, and selecting one of the adjusted images from the memory according to the reading address and outputting the selected adjusted image to the display module.

13. The image processing method according to claim 12, further comprising:
- generating a user interface stored to the memory;
- wherein, when the display module is not folded, the display module displays the user interface and the corresponding adjusted image.

14. The image processing method according to claim 12, wherein the sensor module comprises a first sensor and a second sensor, those adjusted images comprise a first adjusted image, a second adjusted image and a third adjusted image, the first adjusted image is larger than the second adjusted image, and the second adjusted image is larger than the third adjusted image, and the selection step comprises:
- determining whether at least one of a curvature of the first sensor and a curvature of the second sensor is larger than a threshold; and
- selecting the first adjusted image and outputting the first adjusted image to the display module when both of the curvatures of the first sensor and the second sensor are not larger than the threshold.

15. The image processing method according to claim 14, wherein the selection step further comprises:
- determining whether both of the curvatures of the first sensor and the second sensor are larger than the threshold when at least one of the curvatures of the first sensor and the second sensor is larger than the threshold; and
- selecting the second adjusted image and outputting the second adjusted image to the display module when either one but not both of the curvatures of the first sensor and the second sensor are larger than the threshold.

16. The image processing method according to claim 14, wherein the selection step further comprises:
- selecting the third adjusted image and outputting the third adjusted image to the display module when both of the curvatures of the first sensor and the second sensor are larger than the threshold.

17. The image processing method according to claim 12, wherein in the generation step, a difference map between a plurality of original images is generated at an interval of the original images.

18. The image processing method according to claim 12, wherein those adjusted images respectively correspond to a plurality of folding modes of the display module.

19. The image processing method according to claim 12, wherein the display module is formed by one single substrate.

20. The image processing method according to claim 12, wherein the display module is formed by multi-substrates connected together.

* * * * *